United States Patent
Wen

(10) Patent No.: US 10,088,002 B2
(45) Date of Patent: Oct. 2, 2018

(54) BRAKE PAD ASSEMBLY AND HEAT DISSIPATION STRUCTURE THEREOF

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 15/456,961

(22) Filed: Mar. 13, 2017

(65) Prior Publication Data

US 2017/0184168 A1 Jun. 29, 2017

Related U.S. Application Data

(63) Continuation-in-part of application No. 14/864,201, filed on Sep. 24, 2015, now abandoned.

(30) Foreign Application Priority Data

Dec. 5, 2014 (TW) .............................. 103142458 A

(51) Int. Cl.
| | |
|---|---|
| *F16D 65/847* | (2006.01) |
| *F16D 65/00* | (2006.01) |
| *F16D 65/092* | (2006.01) |
| *F16D 55/228* | (2006.01) |
| *F16D 65/78* | (2006.01) |

(52) U.S. Cl.
CPC ......... *F16D 65/847* (2013.01); *F16D 55/228* (2013.01); *F16D 65/0068* (2013.01); *F16D 65/092* (2013.01); *F16D 2065/788* (2013.01); *F16D 2065/789* (2013.01); *F16D 2200/0021* (2013.01); *F16D 2200/0034* (2013.01); *F16D 2200/0039* (2013.01)

(58) Field of Classification Search
CPC .. F16D 65/0068; F16D 65/092; F16D 65/847; F16D 2065/789; F16D 55/228; F16D 2065/788; F16D 2200/0039; F16D 2200/0034; F16D 2200/0021
See application file for complete search history.

(56) References Cited

U.S. PATENT DOCUMENTS

| | | |
|---|---|---|
| 6,303,236 B1 | 10/2001 | Nakao et al. |
| 6,418,020 B1 | 7/2002 | Lin |
| 2006/0266600 A1 | 11/2006 | Demers |

(Continued)

FOREIGN PATENT DOCUMENTS

TW M436108 8/2012

*Primary Examiner* — Melody M Burch
(74) *Attorney, Agent, or Firm* — Muncy, Geissler, Olds & Lowe, P.C.

(57) ABSTRACT

A heat dissipation structure for a brake pad is provided for being assembled to a caliper device. The caliper device includes a caliper body, and the caliper body has a receiving space. The heat dissipation structure includes: a main body, integrally extruded from aluminum and cut to have an ultimate appearance, including a plate body and a heat dissipation portion integrally extending from the plate body, the plate body for being disposed on the caliper body and at least partially extending into the receiving space, when the main body is assembled to the caliper body, the heat dissipation portion is exposed outside the caliper body. A brake pad assembly is further provided, including a heat dissipation structure as described above, further including a brake pad, the brake pad disposed on a lateral face of the plate body.

7 Claims, 5 Drawing Sheets

(56) References Cited

U.S. PATENT DOCUMENTS

| | | |
|---|---|---|
| 2009/0032344 A1 | 2/2009 | Thompson |
| 2012/0000735 A1 | 1/2012 | Iwai et al. |
| 2012/0193175 A1 | 8/2012 | Wen |
| 2014/0060984 A1 | 3/2014 | Tseng et al. |
| 2015/0090538 A1 | 4/2015 | Moore |
| 2015/0176669 A1 | 6/2015 | Wen |
| 2015/0211590 A1 | 7/2015 | Tseng |
| 2016/0160950 A1* | 6/2016 | Wen ............... F16D 65/092 188/264 R |

* cited by examiner

BRAKE PAD ASSEMBLY AND HEAT DISSIPATION STRUCTURE THEREOF

CROSS REFERENCE TO RELATED APPLICATIONS

This application is a Continuation-in-Part of application Ser. No. 14/864,201, filed on Sep. 24, 2015, now abandoned, for which priority is claimed under 35 U.S.C. § 120; and this application claims priority of Application No. 103142458 filed in Taiwan on Dec. 5, 2014 under 35 U.S.C. § 119, the entire contents of all of which are hereby incorporated by reference.

BACKGROUND OF THE INVENTION

Description of the Prior Art

Conventionally, a heat dissipation structure for a brake pad as disclosed in TWM436108 includes a fixing board, an abrading block and at least one heat conduction tube. The fixing board is a board body and has a front side and a rear side. A connecting hole is provided near a bottom portion of the fixing board, and at least one assembling hole is formed around the connecting hole. The abrading block is fixedly disposed on the front side of the fixing board and located above the connecting hole. The at least one heat conduction tube is correspondingly fixedly connected to the at least one assembling hole of the fixing board.

However, in the above-mentioned heat dissipation structure for the brake pad, the heat conduction tube is additionally arranged on the fixing board, and the heat produced by the brake pad abraded has to transmit to the heat conduction tube via the fixing board, so the heat dissipation efficiency is unpreferable. In addition, the fixing board contacts a caliper device directly, and the fixing board may transmit the heat to the caliper device and make the caliper malfunction and decrease a service life of the heat dissipation structure for the brake pad due to rising temperature. Furthermore, members of the above-mentioned structure are complicated, so it is high-cost to manufacture and assemble the members.

US20150090538 discloses that the thermal conductive sheet along with the set of the cooling fins is releasably fastened to the backing plate, and the cooling fins are additionally attached to the thermal conductive sheet. It is clear that the backing plate, the thermal conductive sheet and the cooling fins are separate members and not integrally formed of one piece, and the heat dissipation portion does not fork into two same-thickness portions. As a result, it is not easy, quick and low-cost to manufacture, and it has worse dissipating efficiency.

US20120000735 discloses that the heat dissipation portion is not formed into a continuous tubular structure and does not fork into two same-thickness portions. As a result, the heat cannot be conducted through two ways which are formed by the two forked portions, and thus having poor dissipating efficiency.

U.S. Pat. No. 6,303,236 merely discloses a flat brake disk brake member.

As to US20150211590, in the heat-dissipating portion, each penetrating hole extends longitudinally on the main body, and the fin corresponsive to each penetrating hole is formed into an arch shape and punched from the main body by a stamping method and protruded outwardly towards a side of the main body, and both ends of the fin are coupled to both ends of the penetrating hole respectively. US20150211590's brake pad heat-dissipating structure cannot be formed merely by extrusion and has a weak structure due to holed with the penetrating holes.

U.S. Pat. No. 6,418,020 discloses that the protrusive ribs are separate from one another and do not form a single continuous tubular structure.

The present invention has arisen to mitigate and/or obviate the afore-described disadvantages.

SUMMARY OF THE INVENTION

The major object of the present invention is to provide a brake pad assembly and heat dissipation structure thereof. A plate body and a heat dissipation portion are integrally extruded from aluminum and cut to have an ultimate appearance, so they are easy and efficient to be manufactured. A continuous passage and a heat dissipation protrusive rib are provided for guiding air flow so that the heat produced during the braking process can be quickly dissipated through the continuously circulating air flow. A heat insulation member is further included for being arranged between the main body and a caliper device to prevent the heat from transmitting to the caliper device so as to protect the caliper device, prolong a service life of the caliper device and maintain the functional effectiveness of the caliper device.

To achieve the above and other objects, a heat dissipation structure for a brake pad is provided for being assembled to a caliper device. The caliper device includes a caliper body, and the caliper body has a receiving space. The heat dissipation structure for the brake pad includes: a main body, integrally extruded from aluminum and cut to have an ultimate appearance, including a plate body and a heat dissipation portion which integrally extends from the plate body, the plate body being provided for being assembled to the caliper body and at least partially extending into the receiving space, when the main body is assembled to the caliper body, the heat dissipation portion is exposed outside the caliper body.

To achieve the above and other objects, a brake pad assembly is further provided, including the heat dissipation structure for the brake pad described above, and further including a brake pad which is disposed on a lateral face of a plate body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
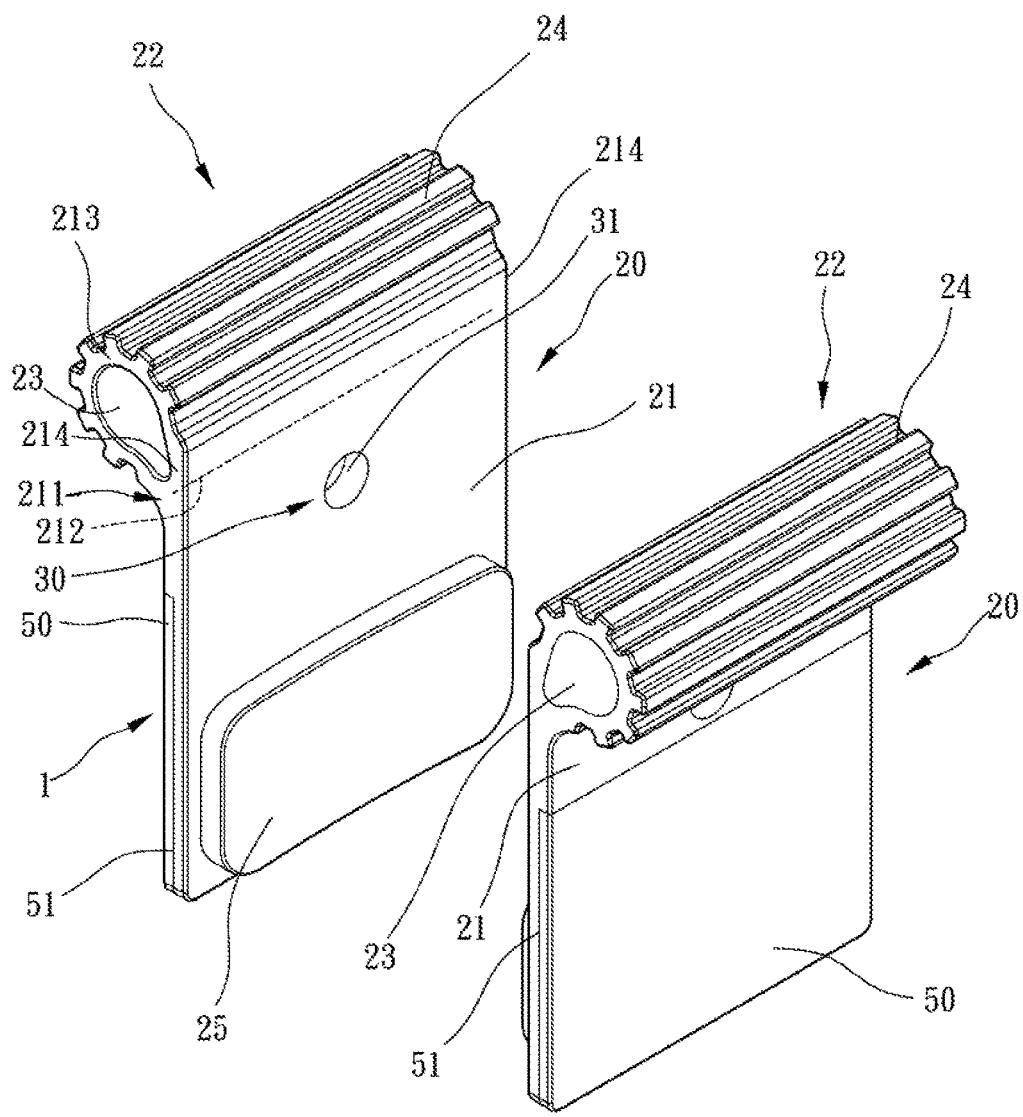
FIG. 1 is a sketch of a preferred embodiment of the present invention.
Figure 2:
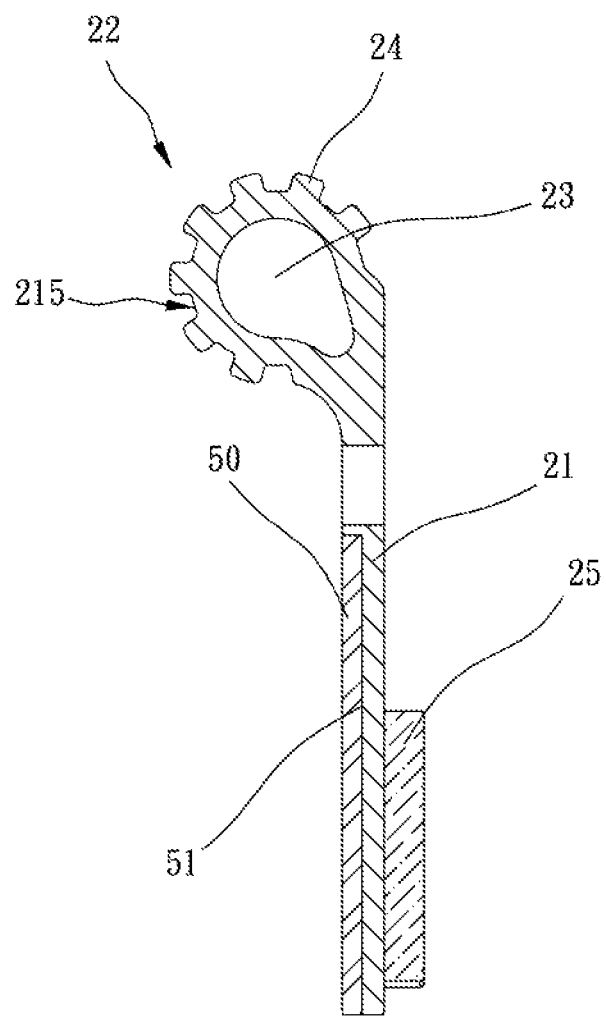
FIG. 2 is a cross-sectional view of the preferred embodiment of the present invention.
Figure 3:
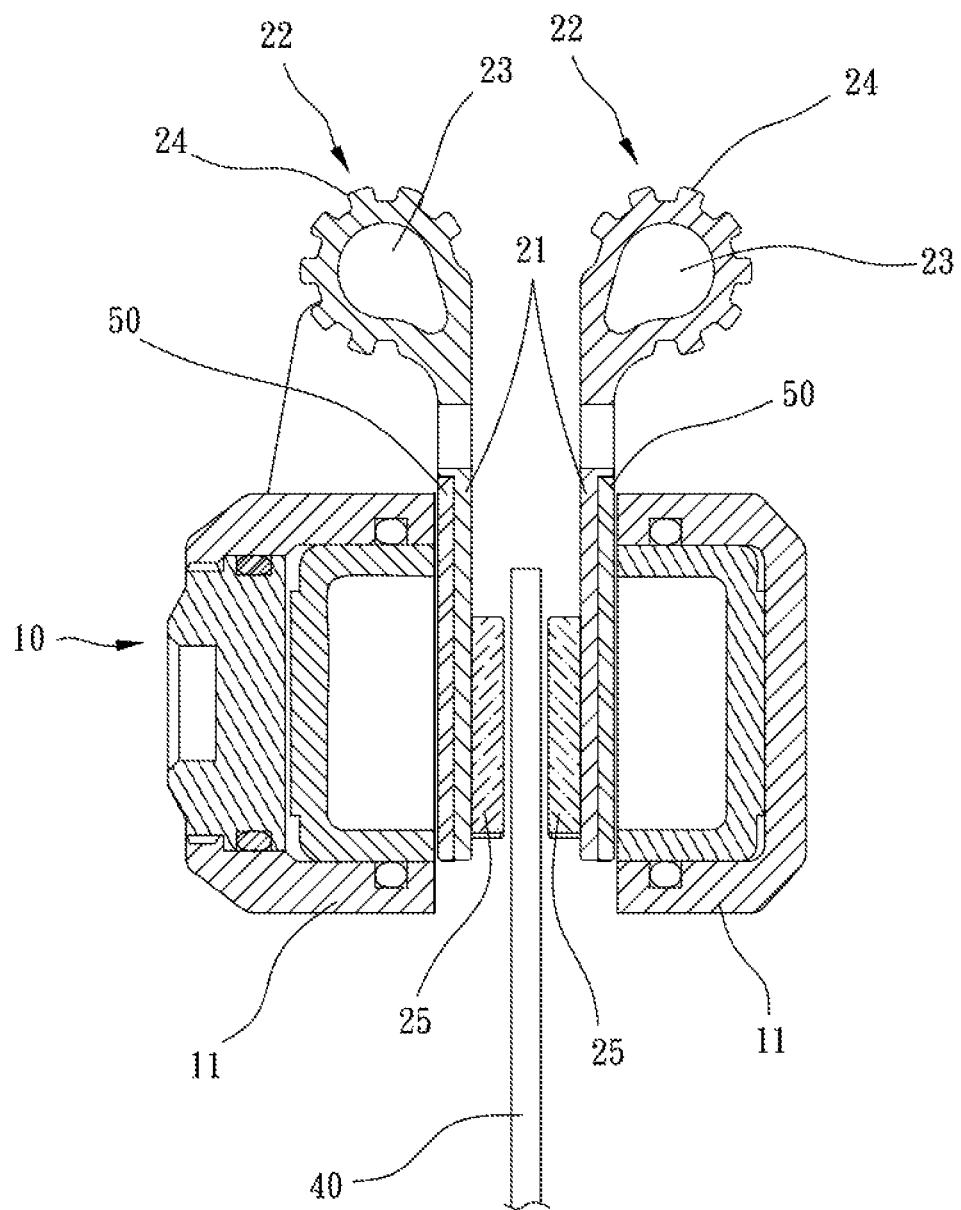
FIG. 3 is a cross-sectional view of the preferred embodiment of the present invention in use.

The present invention will be clearer from the following description when viewed together with the accompanying drawings, which show, for purpose of illustrations only, the preferred embodiment in accordance with the present invention.

Please refer to FIGS. 1 to 4 for a preferred embodiment of the present invention. A heat dissipation structure 1 for a brake pad is provided for being assembled to a caliper device 10, and the caliper device 10 can be mounted on, for example, a bicycle. The caliper device 10 includes a caliper body 11, and the caliper body 11 has a receiving space. The heat dissipation structure 1 for the brake pad includes a main body 20, and the main body 20 includes a plate body 21 and a heat dissipation portion 22.

Specifically, the heat dissipation portion 22 integrally extends from the plate body 21, and the heat dissipation portion 22 curls outwardly relative to the plate body 21 and defines a continuous passage 23. In this embodiment, the heat dissipation portion 22 preferably curls to be substantially circularly curved; however, in other embodiments, the heat dissipation portion 22 may be folded into other shapes, for example, polygonal. Preferably, a thickness of the heat dissipation portion 22 is smaller than a thickness of the plate body 21.

In this embodiment, an end of the heat dissipation portion 22 on a curling direction in which the heat dissipation portion 22 curls is connected with the plate body 21 to form a continuous tubular structure. The heat dissipation portion 22 is formed with a plurality of protrusive ribs 24 arranged in intervals. The protrusive ribs 24 are arranged along a direction parallel to an axial direction of the continuous passage 23; however, in other embodiments, the protrusive ribs may be arranged along a direction transverse to the axial direction of the continuous passage 23.

Figure 4:
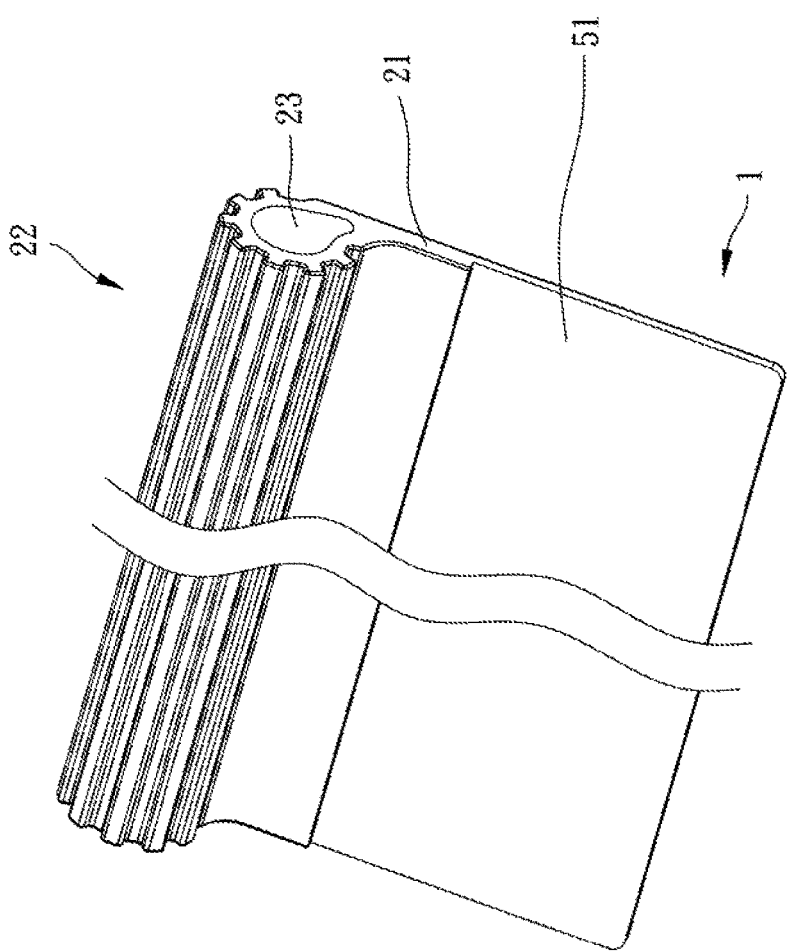
FIG. 4 is a drawing showing an aluminum extrusion of the preferred embodiment of the present invention.

It is to be noted that the plate body 21 and the heat dissipation portion 22 are integrally extruded from aluminum and cut to have an ultimate appearance (an extruded aluminum bar as shown in FIG. 4), so they are easy and quick to be manufactured. Preferably, the extruded aluminum bar can be cut into different widths in accordance with various requirements.

In actual practice, the main body 20 has at least one assembling portion 30, and the assembling portion 30 is for being positioningly assembled to the caliper body 11. The assembling portion 30 may include a through hole 31, and the main body 20 may be disposed through the through hole 31 via a screw member to be fixedly screwed with the caliper body 11. The plate body 21 is assembled to the caliper body 11 and at least partially extends into the receiving space, and when the main body 20 is assembled to the caliper body 11, the heat dissipation portion 22 is exposed outside the caliper body 11.

When a vehicle is driven, the continuous passage 23 faces an air flow, and the continuous passage 23 is for guiding the air flow to flow through the continuous passage 23 continuously. When the caliper device 10 is driven to brake the vehicle (the caliper device 10 receives an external force, for example, a pushing force from the hydraulic system, and a piston of the caliper body 11 pushes the main body 20 to actuate a brake pad 25 assembled to the main body 20 to frictionally contact a disk 40 of the vehicle to brake), the heat produced during an abrading process can be quickly dissipated via the air flow flowing through the continuous passage 23 continuously. It is to be noted that the protrusive ribs 24 formed on the heat dissipation portion 22 can increase dissipation surface of the heat dissipation portion 22 to air so that the heat dissipation efficiency is elevated to produce preferable heat dissipation effect.

More specifically, a side of the plate body 21 may be further provided with a heat insulation member 50, and the heat insulation member 50 is arranged between the plate body 21 and the caliper body 11. For example, the plate body 21 may include a recessed slot 51, and the heat insulation member 50 is engaged in the recessed slot 51. In use, the heat insulation member 50 can decrease an amount of the heat which is produced by the main body 20 during the braking process transmitting to the caliper body 11. The heat insulation member 50 may be a board which is made of titanium alloy, plastic steel or ceramic material, so the heat insulation member 50 has a lower thermal conductivity than that of the main body 20; therefore, the caliper body 11 can be prevented from malfunctioning due to rising temperature, and the caliper device can be protected to prolong a service life and to maintain functional effectiveness.

Specifically, the plate body 21 and the heat dissipation portion 22 are integrally formed of one piece, the heat dissipation portion 22 forks, integrally from a common connection end 211 of the plate body 21 which extends linearly along a widthwise line 212 within the plate body 21, into two portions which are substantially the same in thickness and integrally connected to form one single continuous tubular structure 213 which extends linearly along the widthwise line 212 within the plate body 21, and the single continuous tubular structure 213 protrudes radially to form a plurality of protrusive ribs 24 arranged in intervals. The single continuous tubular structure 213 extends from one of two opposite sides 214 of the plate body 21 to the other of the two opposite sides 214 of the plate body 21 and has a fixed closed cross-sectional profile 215. Each of the plurality of protrusive ribs 24 extends in a direction parallel to the widthwise line 212 within the plate body 21.

A brake pad assembly is further provided, including a heat dissipation structure 1 for a brake pad described above and a brake pad 25. The brake pad 25 is arranged on a lateral face of the plate body 21, and the brake pad assembly may be assembled to a caliper device of the vehicle. During the braking process, the brake pad assembly can dissipate heat quickly to prevent the brake pad 25 from malfunctioning due to overheating and to decrease the amount of heat transmitting to the caliper device.

Figure 5:
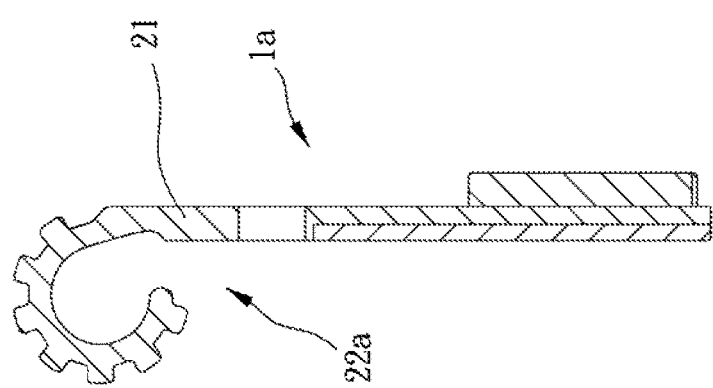
FIG. 5 is a cross-sectional view of another preferred embodiment of the present invention.

Please refer to another embodiment as shown in FIG. 5. A distal end of a heat dissipation portion 22a of a heat dissipation structure 1a for a brake pad on the curling direction in which the heat dissipation portion 22a curls may be a free end. Specifically, an end of the heat dissipation portion 22a on the curling direction in which the heat dissipation portion 22a curls may be unconnected with the plate body 21 to form a notch for air circulation and heat dissipation.

Figure 6:
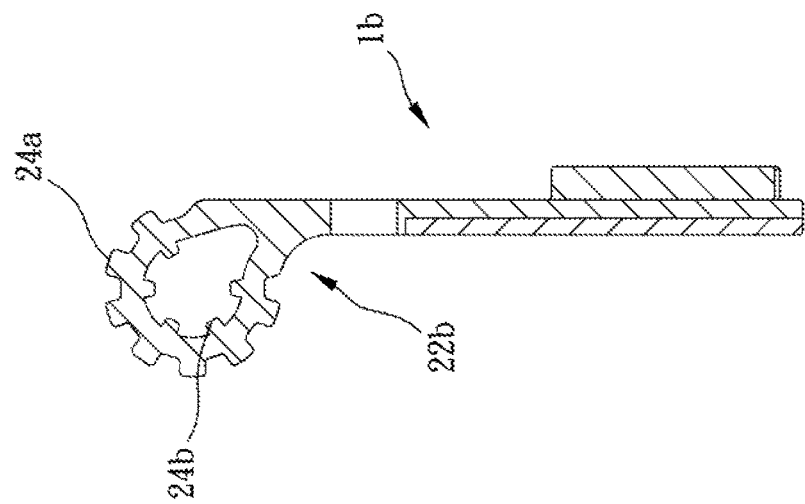
FIG. 6 is a cross-sectional view of still another preferred embodiment of the present invention.

Please refer to still another embodiment as shown in FIG. 6. An inner surface and an outer surface of a heat dissipation portion 22b of a heat dissipation structure 1b for a brake pad are respectively formed with a plurality of protrusive ribs 24a, 24b to increase heat dissipation area and elevate heat dissipation effectiveness.

Given the above, in the brake pad assembly and the heat dissipation structure thereof, the plate body and the heat dissipation portion are integrally extruded from aluminum and cut to have an ultimate appearance; therefore, it is easy, quick and low-cost to manufacture the brake pad assembly and the heat dissipation structure thereof.

In addition, the continuous passage for guiding air flow and the protrusive ribs are provided, so the heat produced during the braking process can be quickly dissipated through the continuously circulating air flow.

Furthermore, the heat insulation member arranged between the main body and the caliper device is provided to prevent the heat from transmitting to the caliper device, protect the caliper device, prolong the service life of the caliper device and maintain the functional effectiveness of the caliper device.

While we have shown and described various embodiments in accordance with the present invention, it should be clear to those skilled in the art that further embodiments may be made without departing from the scope of the present invention.

What is claimed is:

1. A heat dissipation structure for a brake pad, provided for being assembled to a caliper device, the caliper device including a caliper body, the caliper body having a receiving space, the heat dissipation structure including:
    a main body, integrally extruded from aluminum and cut to have an ultimate appearance, including a plate body and a heat dissipation portion which integrally extends from the plate body, the plate body being provided for being assembled to the caliper body and at least partially extending into the receiving space, when the main body is assembled to the caliper body, the heat dissipation portion is exposed outside the caliper body;
    wherein the plate body and the heat dissipation portion are integrally formed of one piece, the heat dissipation portion forks, integrally from a common connection end of the plate body which extends linearly along a widthwise line within the plate body, into two portions which are substantially the same in thickness and integrally connected to form one single continuous tubular structure which extends linearly along the widthwise line within the plate body, and the single continuous tubular structure protrudes radially to form a plurality of protrusive ribs arranged in intervals;
    wherein the single continuous tubular structure extends from one of two opposite sides of the plate body to the other of the two opposite sides of the plate body and has a fixed closed cross-sectional profile;
    wherein each of the plurality of protrusive ribs extends in a direction parallel to the widthwise line within the plate body.

2. The heat dissipation structure for the brake pad of claim 1, wherein the plurality of protrusive ribs are distributed over a half of a circumference of the continuous tubular structure.

3. The heat dissipation structure for the brake pad of claim 1, wherein the plurality of protrusive ribs are disposed on an inner surface and an outer surface of the continuous tubular structure.

4. The heat dissipation structure for the brake pad of claim 1, wherein a side of the plate body is provided with a heat insulation member, the heat insulation member is arranged between the plate body and the caliper body, the heat insulation member is embedded into the plate body, and the plate body and the heat insulation member are aligned with each other in a thickness direction of the plate body.

5. The heat dissipation structure for the brake pad of claim 4, wherein the heat insulation member is a board made of titanium alloy, plastic steel or ceramic material.

6. The heat dissipation structure for the brake pad of claim 1, wherein the main body is formed with at least one assembling portion, and the assembling portion is for being positioningly assembled to the caliper body.

7. A brake pad assembly, including the heat dissipation structure for a brake pad of claim 1, further including a brake pad which is disposed on a lateral face of the plate body.

\* \* \* \* \*